United States Patent Office 3,299,180
Patented Jan. 17, 1967

3,299,180
POLYVINYL CHLORIDE-POLYMERIZED CYCLO-
PENTADIENE COMPOSITION AND ELECTRICAL
CONDUCTOR COATED WITH SAME
Louis P. Wilks, Chicago, Ill., assignor to Velsicol Chemical Corporation, Chicago, Ill., a corporation of Illinois
No Drawing. Filed Dec. 18, 1961, Ser. No. 160,356
7 Claims. (Cl. 260—890)

This application is a continuation of my copending application Serial No. 744,906, filed June 27, 1958, now abandoned.

This invention relates to new resinous compositions of matter containing polymerized cyclopentadiene and methyl cyclopentadiene. In particular, this invention relates to compositions containing polyvinyl compounds and thermal polymers of cyclopentadiene and methyl cyclopentadiene.

In the past several years, polyvinyl resins have become of significant importance. They are of particular importance in the fields of surface coatings, insulation, packaging, small molded objects, piping, adhesives, as well as practically all applications of resinous material. This phenomenal use of these polymers can be readily attributable to their excellent physical, chemical and electrical properties, properties oftentimes unavailable in otherwise comparable materials.

However, the relatively high cost of these resins has hindered their use, and coupled with certain deficiencies in their properties, has prevented their expansion into new applications. Thus, while the known polyvinyl resins have excellent mechanical and electrical characteristics, in particular applications thereof, improvement in these properties would be of considerable value, particularly if accompanied with a reduction in the unit cost.

It is therefore an object of the present invention to devise new resinous compositions of matter.

Another object of the present invention is the preparation of new resinous material containing polyvinyl compounds.

Also, an object of the present invention is the creation of compositions containing polymerized dicyclopentadiene which have beneficial physical, chemical and electrical properties.

Another object of the present invention is the preparation of resinous material containing polyvinyl polymers and polymerized cyclopentadiene and methyl cyclopentadiene in unique combination.

Still another object of the present invention is the preparation of new compositions particularly useful as coating material.

Still other objects of the present invention will become apparent from the ensuing description.

Unexpectedly it has been determined that the combination of a polyvinyl resin (polyvinyl chloride, polyvinyl bromide, polyvinyl acetate, polyvinylidene chloride and copolymers thereof) and polymerized dicyclopentadiene (or cyclopentadiene) presents a new, unique product with valuable properties at a relatively low cost.

The compatibility of these two structurally dissimilar components is not predictable from the literature since one of the components is a polymer of an aliphatic olefin and the monomer of the other component is an alicyclic diolefin. It would appear from the art that such polymers would be incompatible. As unexpected as it was to find that up to certain limits these two resinous materials were readily compatible, it was even more surprising to determine that the properties of the combination in many instances were vastly superior to the polyvinyl resin itself, particularly in view of the fact that the thermally polymerized dicyclopentadiene (or cyclopentadiene) resin by itself does not have comparable physical and electrical properties. Thus it has been determined that these two dissimilar polymeric materials can be combined to form a new resinous material with certain properties superior to the same property in either component.

The present combinations are prepared by means known to the art for the incorporation of additives into polymeric materials. Thus, for example, dry blending techniques operable for the incorporation of stabilizers, plasticizers, fillers and the like into these polymers can be used in the preparation of the present compositions. While the standard dry blending operation is operable to produce these new compositions, certain modifications thereof can be made to improve its function. Thus, for example, the generally accepted dry blending operation for polyvinyl chloride, composed of preheating the polyvinyl resin to about 150° F., spraying preheated plasticizer thereon, heating the blend to about 200° F. to dry it, followed by addition of stabilizers, fillers and pigments, and then cooling the mixture, can be adapted to produce the present product, a blender of the ribbon or dough type being sufficient or a muller can be used. A desired modification in this procedure is the cooling of the mixture after it has been dried at 200° F., after said cooling the dicyclopentadiene polymer being incorporated therein. Other comparable procedures for the blending of resinous material can be used with varying efficiencies.

The present compositions are in essence composed of polyvinyl resin and up to about 35% by weight, based on the polyvinyl resin of thermally polymerized cyclopentadiene polymer. While polyvinyl bromide, acetate and their copolymers are applicable, of particular importance are the compositions containing polyvinyl chloride. Further, the polymer of cyclopentadiene in accordance with the present invention is a thermally polymerized dicyclopentadiene, preferably a polymer of cyclopentadiene containing a minimum of other polymers.

As described in my copending application Serial No. 744,905, filed June 27, 1958, now United States Patent No. 3,084,147, a polymer of dicyclopentadiene (or cyclopentadiene) having a melting point between about 250° F. and 400° F. and highly compatible with polyvinyl chloride is readily prepared by the thermal polymerization of high purity dicyclopentadiene substantially in the liquid phase at a temperature between about 450° and 550° F., preferably between about 500° and 550° F., in the absence of catalyst for from about 1 to 10 hours, preferably 4 to 5 hours, in a closed system under sufficient pressure to keep the reaction mixture in the liquid phase. The dicyclopentadiene feed preferably should contain a maximum of about 10% of other polymerizables to minimize the formation of other polymers and copolymers which detract from the desired properties of the polymers. It is preferred to even further minimize the presence of non-polymerizables other than dicyclopentadiene (or cyclopentadiene) and homologs thereof to as low as possible, preferably 3% by weight of the dicyclopentadiene. As is evident from the above, dicyclopentadiene and cyclopentadiene are equivalent as starting materials for the production of the cyclopentadiene polymer.

The charge is thus a dicyclopentadiene (or cyclopentadiene) fraction preferably containing a minimum of 85% dicyclopentadiene. As is general in the preparation of resinous materials, it is desirable, if not commercially necessary, to perform the polymerization in the presence of an inert solvent so as to allow for control of the reaction and for ease of removal of the product from the reactor. Thus in the present process it is desirable to perform the polymerization in the presence from about 30% to about 60% by weight of the high purity dicyclopentadiene charge of an aromatic solvent inert to said feed, such as xylene, toluene or benzene. It is to be understood that large proportions of solvent can be used but that they will tend to lengthen the reaction time and thus not be advantageous. So too is it evident that the high purity dicyclopentadiene feed can contain less than 85% actual dicyclopentadiene provided that the amount of polymerizables other than dicyclopentadiene present therein is less than about 10% by weight of the actual dicyclopentadiene present and preferably less than about 3% by weight of the dicyclopentadiene, in which case proportionately less solvent need be added to provide the desired reaction mixture. Consequently the preferred reaction mixture initially contains from about 30% to about 60% dicyclopentadiene, up to about 3% by weight of other polymerizables and inert, non-polymerizable solvent. The critical portion of the reaction mixture is the minimum quantity of polymerizables other than dicyclopentadiene.

It is to be understood that methyl cyclopentadiene is equivalent to cyclopentadiene in the preparation of the herein described thermal polymer of cyclopentadiene. Thus the feed material can contain cyclopentadiene, methyl cyclopentadiene, their dimer, codimers and mixtures thereof in the prescribed quantities. Consequently, the cyclopentadiene polymer discussed herein is equivalent to a methyl cyclopentadiene polymer and mixtures thereof.

The following example illustrates the preparation of this polymer of dicyclopentadiene:

EXAMPLE I

This example was performed using a continuous system, the reactor having a capacity of 5.7 gallons. The feed was composed of 50% by weight of xylene and 50% by weight of a fraction containing 92% by weight of dicyclopentadiene. This feed was fed into the reactor at a rate of 1.3 gallons per hour and heated therein to a temperature between 520–530° F. at 300 pounds per square inch pressure for 4½ hours, passing uniformly through the reactor for said time period. The product solution was then reduced, i.e., the xylene and unreacted starting material removed from the product under 30 mm. Hg and at a maximum temperature of 500° F. to remove the solvent. The product resin had a melting point of 300–330° F. and a Gardner color of 10+. The yield of product based on the dicyclopentadiene charged was 94%.

In view of the dissimilarity in structure and properties of the two resins it was surprising to find the relatively high degree of compatibility of the thermally polymerized dicyclopentadiene and vinyl chloride, since other polymers have been determined to be relatively incompatible with polyvinyls. It was therefore quite unexpected to determine that a considerable quantity of the dicyclopentadiene polymer could be combined with the polyvinyl resin, up to about 35% by weight. Quantities of from about 10% to about 25% are more readily compatible, and for many applications more valuable. Further, economically speaking, it is normally undesirable to prepare compositions in accordance with the present invention containing less than 3% of the dicyclopentadiene polymer, and therefore a range of from about 3% to about 35% by weight thereof is preferred.

While the reason for this unusual and highly beneficial compatibility is not fully understood, possible explanations for this phenomena include the existence of an alloying type of effect, which causes the two materials to be fluxed together similar to the alloying of metals; an adsorption of the dicyclopentadiene molecules by the polyvinyl or a dissolving of one of the components into the other based on solubility. Regardless of the actual mechanics permitting this high degree of compatibility, its existence is clear and the products thereof are a valuable new type of resinous matter capable of superior results as a substitute for existing materials and presenting properties which will open up new applications of this type material. While the finding of the high compatibility of the thermally polymerized dicyclopentadiene resin with polyvinyl resins was unexpected, it was particularly surprising to find that formulations containing this combination have properties equivalent to and in many instances superior to comparable formulations containing the polyvinyl but not the dicyclopentadiene polymer.

In accordance with this use, the resultant formulations will contain stabilizers, plasticizers, and other normal additives, with the present product being substituted for a portion of the polyvinyl chloride. Thus, for example, the following formulations were prepared:

EXAMPLE II

| | Grams |
|---|---:|
| Polyvinyl chloride | 90 |
| HB 40 | 14.9 |
| Product of Example I | 9.0 |
| Dioctyl phthalate | 7.6 |
| Dyphos | 2.7 |
| Tribase | 9.0 |
| Paraffin | 0.5 |
| Calcium stearate | 0.9 |

HB 40 is a clear, mobile, high boiling hydrocarbon distilling between 345–420° F. Dyphos is the dibasic lead salt of phosphorous acid. Tribase is hydrous tribasic lead sulfate.

This formulation was prepared by milling the various components together in a ball mill. The blend was then compression molded at a temperature of 355° F. and 5,000 pounds per square inch pressure, and the molded article by actual test had a tensile strength of 1,944 pounds per square inch.

A standard was prepared in which the above formulation was employed except that additional polyvinyl chloride replaced the product of Example I, and the molded article was found to have a tensile strength of only 1,416 pounds per square inch. Thus the formulation containing the cyclopentadiene polymer had improved tensile strength.

EXAMPLE III

| | A Grams | B Grams | C Grams |
|---|---:|---:|---:|
| Polyvinyl chloride | 1,000 | 800 | 750 |
| Product of Example I | | 200 | 250 |
| Atomite | 130 | 130 | 130 |
| Tribase | 51 | 51 | 51 |
| Dioctylphthalate | 253 | 253 | 253 |
| HB 40 | 131 | 131 | 131 |
| Santicizer 140 | 126 | 126 | 126 |

Atomite is a mechanically ground calcium carbonate. Santicizer 140 is monocresyl diphenyl phosphate.

These formulations were prepared by the method previously outlined and extended onto electrical conductor wire. It is evident that the sole difference between formulations A, B, and C is the quantity of the cyclopentadiene polymer included therein. These formulations were then tested for electrical resistance with the following results being obtained:

Resistance (megohms/ft.)

| A | B | C |
|---|---|---|
| 34 | 294 | 504 |

Clearly, formulations B and C which contain the present product have vastly improved electrical resistance unpredictable from the properties of the individual components. It is these properties which make the present combination highly valuable as a continuous flexible surrounding layer for electrical conductors. In this use, the present combinations extruded onto the wire by means commonly used for polyvinyl chloride resins.

Many other formulations can be readily prepared by the various means available for the formulation of polyvinyl resin formulations, with the variations in the type of formulation and the ratio of ingredients being dependent on its intended use.

The following procedure was employed to make the accompanying formulations using a ribbon blender as the mixing equipment:

(1) The polyvinyl chloride was heated to 150° F. and charged to the blender.

(2) The plasticizer was preheated to 150° F. and sprayed upon the resin in the blender.

(3) The mixture was heated to about 200° F. and blended until dry.

(4) The mixture was then cooled to room temperature.

(5) The thermally polymerized dicyclopentadiene resin of Example I was added and blended therein.

(6) The stabilizers and lubricants were added.

(7) The pigments and fillers were added and blended.

EXAMPLE IV

|  | Parts |
|---|---|
| Polyvinyl chloride | 100 |
| Product of Example I | 25 |
| Atomite | 17.5 |
| Titanox RANC | 10.0 |
| Santicizer 140 | 10.0 |
| HB 40 | 10.0 |
| Dioctylphthalate | 35.0 |
| Panaflex BN-1 | 10.0 |
| Calcium stearate | 1.0 |
| Mikalite 155 | 5.0 |
| Tribase | 10.0 |

EXAMPLE V

|  | Parts |
|---|---|
| Polyvinyl chloride | 100 |
| Product of Example I | 33.5 |
| Atomite | 33.5 |
| Titanox RANC | 5.2 |
| Santicizer 140 | 5.2 |
| Santicizer 160 | 17.5 |
| Dioctylphthalate | 17.5 |
| HB 40 | 12.5 |
| Dutrex | 25.0 |
| Mikalite 155 | 6.2 |
| Acrowax C | 1.0 |
| Tribase | 10.0 |

Titanox RANC is a titanium dioxide pigment. Santicizer 160 is a plasticizing, oily liquid with a boiling point at 6.5 mm. Hg of approximately 225° C. and a specific gravity of 1.118. Mikalite 155 is a micaceous type pigment filler. Dutrex is a complex, dark amber-colored hydrocarbon plasticizer of aromatic structure. Acrowax C is a light tan-colored synthetic wax of high luster with a melting point of 137–139° C. Panaflex BN-1 is a polyaromatic hydrocarbon oil plasticizer as shown in Modern Plastics Encyclopedia, September 1957, pages 602–603.

The above formulations are of particular value for the preparation by extrusion of wire coatings. As shown by the data of Examples II and III, the significant improvement in the mechanical and electrical properties of this type formulations as compared to those not containing the thermally polymerized dicyclopentadiene makes it quite useful in wire and cable coatings and in the preparation of various types of insulatory materials. These combinations can be readily extruded by means used for ordinary polyvinyl chloride formulations. If desired, in place of the dry blend process the combination can be prepared by the Banbury process, a more conventional process, or by the use of a rubber mill. These processes are readily adaptable to the present formulations, the dicyclopentadiene polymer being incorporated simultaneously with the stabilizers, lubricants, pigments, plasticizers and other additives after the polyvinyl resin has been charged to the Banbury or comparable internal type mixer or mill. The formulation can then be pelletized and extruded if desired, or otherwise processed in accordance with procedures used for polyvinyl chloride formulations. Additional information on many of the trade names used in the formulations including HB 40, Tribase, Santicizer 140 and 160, Dutrex, Acrowax C and Dow Plasticizer No. 5 can be found in the 1953 edition of "Handbook of Material Trade Names," Zimmerman and Lavine, and the 1957 supplement thereto. Other information thereon can be obtained from the brochures of the manufacturers.

If desired, plastisols, i.e., a suspension of resin in which the liquid phase is a system of plasticizers, can be prepared with the present composition as the suspended resin by stirring said composition and the other dry ingredients (stabilizers, pigments, fillers, etc.) into the plasticizers in a simple low shear mixer. In such suspensions the plasticizer phase can be supplemented with a volatile organic diluent, thus allowing the formulator to vary the flow properties of the dispersion without affecting its other properties.

A typical plastisol formulation of the present composition is as follows:

|  | Parts |
|---|---|
| Polyvinyl chloride | 90 |
| Thermally polymerized dicyclopentadiene | 10 |
| Dioctylphthalate | 30 |
| Dow Plasticizer No. 5 | 55 |
| HB 40 | 10 |
| Flomax 25 | 3 |

Dow Plasticizer No. 5 is an aryl phosphate for electrical grade. Flomax 25 is a barium-cadmium liquid stabilizer.

As above indicated, the utility of the present composition is virtually unlimited in view of its superb properties which in several instances are better than the widely used polyvinyl chloride formulations, particularly in view of their improved economics. One of the prime applications is as a wire and cable coating wherein mechanical strength and electrical resistance are necessary prerequisites for successful service. These coatings are generally prepared by extrusion. However, the utility of the present compositions is by no means limited thereto as they can be slush molded, compression molded, injection molded, calendered, etc. Among the applications for which the present product is useful are lining material, in the preparation of varnishes and other surface coatings, in the manufacture of tile, inks, artificial leather finishes, packaging material, ornamental applications, and virtually all present existing uses of polyvinyl material such as in the production of phonograph records, adhesives, and water emulsion paints.

I claim:

1. A composition composed principally of polyvinyl chloride and up to about 35% by weight based on the polyvinyl chloride of thermally polymerized cyclopentadiene homopolymer.

2. In combination, polyvinyl chloride and from about 3% to about 35% by weight of the polyvinyl chloride of thermally polymerized cyclopentadiene homopolymer having a melting point between about 300° F. and 330° F.

3. A composition of matter composed principally of polyvinyl chloride and from about 10% to about 25% by weight of the polyvinyl chloride of thermally polymerized diene homopolymer selected from the group consisting of cyclopentadiene, methyl cyclopentadiene and mixtures thereof.

4. A composition of matter consisting essentially of a blend of polyvinyl chloride and from about 10% to about 25% by weight of the polyvinyl chloride of thermally polymerized cyclopentadiene homopolymer having a melting point between about 250° F. and 400° F.

5. A composition of matter consisting essentially of a blend of polyvinyl chloride and from about 10% to about 25% by weight of the polyvinyl chloride of thermally polymerized methyl cyclopentadiene homopolymer having a melting point between about 250° F. and 400° F.

6. In combination, polyvinyl chloride and from about 3% to about 35% by weight of the polyvinyl chloride of thermally polymerized cyclopentadiene homopolymer having a melting point between about 250° F. and 400° F.

7. The combination with an electrical conductor wire of a continuous flexible plastic surrounding layer composed essentially of polyvinyl chloride and from about 10% to about 25% by weight of the polyvinyl chloride of thermally polymerized cyclopentadiene homopolymer.

References Cited by the Examiner
UNITED STATES PATENTS

| | | | |
|---|---|---|---|
| 2,314,903 | 3/1943 | Soday | 260—93.1 |
| 2,345,583 | 4/1944 | Chaney | 260—93.1 XR |
| 2,608,550 | 8/1952 | Rowland et al. | 260—887 |
| 2,625,523 | 1/1953 | Garber et al. | 260—887 |
| 2,956,040 | 10/1960 | Dietz et al. | 260—890 |

MURRAY TILLMAN, *Primary Examiner.*

GEORGE F. LESMES, LEON J. BERCOVITZ, J. A. KOLASCH, *Assistant Examiners.*